United States Patent [19]

Engels et al.

[11] Patent Number: 4,681,631
[45] Date of Patent: Jul. 21, 1987

[54] INORGANIC MOLDING COMPOSITION CONTAINING A LITHOGENOUS COMPONENT

[75] Inventors: Hans-Werner Engels, Troisdorf; Karlheinz Neuschäffer, Leichlingen; Paul Spielau, Troisdorf-Eschmar, all of Fed. Rep. of Germany

[73] Assignee: Dynamit Nobel Aktiengesellschaft, Troisdorf, Fed. Rep. of Germany

[21] Appl. No.: 848,493

[22] Filed: Apr. 7, 1986

[30] Foreign Application Priority Data

Apr. 6, 1985 [DE] Fed. Rep. of Germany ....... 3512515
Apr. 6, 1985 [DE] Fed. Rep. of Germany ....... 3512516

[51] Int. Cl.⁴ .............................................. C04B 12/04
[52] U.S. Cl. ............................................ 106/4; 106/84
[58] Field of Search .................. 106/74, 84, DIG. 1

[56] References Cited

FOREIGN PATENT DOCUMENTS 276288  5/1964  Australia ................. 106/84
57-135762 8/1982  Japan .................... 106/84
747837  7/1980  U.S.S.R. ................. 106/84

*Primary Examiner*—William R. Dixon, Jr.
*Assistant Examiner*—Steven Capella
*Attorney, Agent, or Firm*—Antonelli, Terry & Wands

[57] ABSTRACT

An inorganic, aqueous molding composition is described which can be hardened at low temperatures into molded parts having a high flexural stress at break.

The molding composition is produced from electrostatic precipitator ash of high-temperature coal-burning power plants, this ash containing 45-55% by weight of vitreous $SiO_2$ in addition to $Al_2O_3$, or from calcined bauxite by reaction with an alkaline alkali silicate solution at a low temperature; fillers being optionally present.

17 Claims, No Drawings

INORGANIC MOLDING COMPOSITION CONTAINING A LITHOGENOUS COMPONENT

This invention relates to an inorganic molding composition of an alkali silicate solution and electrostatic precipitator ash and/or ground calcined bauxite as an active lithogenous component, as well as optionally fillers and also to molded parts made from this molding composition.

The special feature exhibited by such inorganic molding compositions resides in that moldable and, in particular, pourable mixtures are actively hardened after a short period of time by reaction of the active component, and can then be removed from the mold.

An additional, special feature resides in that hardening occurs at low temperatures of up to at most 200° C., in the normal case at most 100° C., with attainment of high values for flexural stress at break. Such flexural stress at break values are comparable to those of ceramic material, but ceramic material achieves such values for flexural stress at break only at very high temperatures.

Molding compositions with these properties are obtainable only with quite specific solid materials as the active lithogenous component.

Thus, according to DOS No. 3,246,602, for example, an oxide mixture of $SiO_2$ and aluminum oxide is a lithogenous component, this oxide mixture consisting of amorphous $SiO_2$ and essentially crystalline aluminum oxide, as well as further components. This oxide mixture is anhydrous and is produced, in particular, in special processes, especially in the form of dust by precipitation from the vapor or gaseous phase during the manufacture of corundum.

Such an oxide mixture exhibits very greatly fluctuating compositions and displays a constantly changing, unpredictable activity as the stone-forming or lithogenous component.

Consequently, such oxide mixtures are difficult to handle and require determination of the activity as lithogenous components by means of tests and subsequent blending of materials of varying activities into standard materials.

Therefore, the objects resides in providing an aqueous, hardenable molding composition based on solid, hardenable, active components exhibiting adequate activity and available in relatively large amounts of uniform quality.

Consequently, the invention is directed to an inorganic, aqueous molding composition hardenable at low temperatures and comprises of an inorganic, solid component and an alkali silicate solution, optionally with proportions of fillers and auxiliary substances contained therein, characterized in that the composition contains 0.5–4.0 parts by weight of (a) vitreous amorphous electrostatic precipitator ash with 45–60% by weight of vitreous $SiO_2$, 25–35% by weight of $Al_2O_3$, and 8–11% by weight of $Fe_2O_3$ and/or (b) ground calcined bauxite, per one part by weight of the alkali silicate solution containing 1.2–2.5 moles of $SiO_2$ per mole of $K_2O$ and $Na_2O$.

Preferably, when calcined bauxite forms at least a part of the solid component, the calcined bauxite is contained in amounts of 0.5–3.0, very preferably 0.6–2.1 parts by weight per one part by weight of the alkali silicate solution.

This so-called "electrostatic precipitator" ash employed component (a) is produced in coal-burning power plants only at combustion chamber temperatures of 1,600°–1,700° C. and, on account of this genesis, is of identical reactivity as a component of the molding composition. The electrostatic precipitator ash is deposited in such power plants in the electrostatic precipitators from the flue gases and is correspondingly finely divided.

In the normal case, particle size of the ash is below 10 $\mu m$ to an extent of 65%, below 20 $\mu m$ to an extent of 80%, and below 60 $\mu m$ to an extent of 90%. Analysis of most samples reveals 48–52% by weight of $SiO_2$, 25–30% by weight of $Al_2O_3$, and 8–11% $Fe_2O_3$, additional components being contained therein in only small quantities.

The electrostatic precipitator ash is, according to its appearance, a silicate-type glass, predominantly a ferroaluminum silicate glass containing proportions of other oxides.

Although glasses in general exhibit low reactivity with respect to alkalis, electrostatic precipitator ash shows high reactivity with the aforementioned alkali silicate solution.

The preferred proportion of electrostatic precipitator ash participating in the reaction is 0.8–3.0 parts by weight per 1 part by weight of alkali silicate solution. However, it is also possible to utilize electrostatic precipitator ash in the form of a filler, in which case part of the electrostatic precipitator ash does not actively participate in stone formation. In this instance, electrostatic precipitator ash can constitute the entire solid proportion, preferably up to 95% of the solid proportions.

Calcined bauxite is produced by heating crushed or ground bauxite to temperatures of about 400° to 1,000° C. whereby the water content of the bauxite is practically entirely removed. Natural bauxite is a mixture of several aluminum silicate minerals with a composition, varying in dependence on the site of origin, of 50–70% by weight of $Al_2O_3$, 0–25% by weight of $Fe_2O_3$, 12–40% by weight of water, 2–30% by weight of $SiO_2$, as well as smaller proportions of further materials.

Surprisingly, calcined ground bauxite has the property of reacting in a lithogenous manner with alkali silicate solutions at only low hardening temperatures, although others of the numerous minerals based on aluminum oxide or of the aluminum silicates fail to exhibit this property, either in the original or in the calcined condition.

Calcined bauxite as a solid component of the hardening system is even superior to the extensively amorphous oxide mixture according to DOS No. 3,246,602, in that flexural stresses at break can be obtained of between 15 and 18 $N/mm^2$.

It is unnecessary to subject the bauxite to fine grinding; rather, a grinding fineness wherein the coarsest particles range between 0.25 and about 0.32 mm is adequate.

It is possible to substitute in part, component (b) and also optionally component (a) preferably a proportion of up to 10% by weight; most preferably up to 3% by weight with furnace filter dust formed during the manufacture of corundum, mullite, or similar compounds. According to DOS No. 3,246,602, furnace filter dust is an anhydrous oxide mixture of amorphous $SiO_2$ and $Al_2O_3$. Although merely small proportions of the oxide mixture are added, the reaction period during hardening is reduced to about one-half.

Preferably, the alkali silicate solution contains 1.3-2.2 moles of $SiO_2$ per mole of $K_2O$ and $Na_2O$. In alkali silicate solutions, $K_2O$ is preferred over $Na_2O$. The alkali silicate solutions are to contain an excess of alkali. Very preferably, such alkali silicate solutions are obtained by dissolving amorphous disperse-pulverulent, aqueous silicic acid, the so-called precipitated silicic acid. In this connection, a solution of the alkali hydroxides or solid alkali hydroxide is preferably made to react with the precipitated silicic acid with the addition of water.

The components are mixed for producing the molding composition; suitably, a preliminary reaction of components (a) and/or (b) and the alkaline silicic acid solution takes place at room temperature, which can last, for example, for 20-40 minutes. After such a preliminary reaction, suitable molds are filled with the molding composition wherein, in the normal case, solidification$^{(x)}$ occurs after a relatively brief time period, permitting removal from the mold. The molded parts can be hardened in the mold or preferably after unmolding; temperatures of between 50° and 100° C. are preferred and surprisingly are adequate for this purpose. The hardening time is comparatively short and ranges between 20 and 40 minutes. Insofar as no solidification occurs spontaneously within the mold, the hardening step is to be performed in the mold, for example, at 50°-100° C. Hardening can also take place at higher temperatures, up to, for example, 500° C., as long as there is no vaporization of water that has not as yet been bound (x) solidification is the first part of hardening by chemical reaction.

Hardening can also be conducted under pressure of 100 to 6000 psi at 50° up to, for example, 500° C., preferably 50°-200° C.

Molded parts are obtained having a surprisingly high flexural stress at break, exceeding 10 $N/mm^2$ and capable of assuming values of up to 15 $N/mm^2$ and thereabove.

The alkali silicate solutions generally have a water content of 28-45% by weight; in case of the sodium silicate solutions, which are not preferred, this water content can also be up to 60% by weight, the solutions having a lower water content being preferred. In the molding compositions, the water content can amount to 20-65% by weight, based on the active lithogenous components and without considering the fillers; water contents of 26-58% by weight are preferred.

The starting materials serving as the solid reactants, namely, electrostatic precipitator ash, calcined bauxite, and optionally oxide mixture, have a practically unlimited shelf life; furthermore, precipitated silicic acid is obtainable as a pourable powder that can be stored for a long time, but it can also be utilized in the filter-moist state or as a pasty gel. Fillers can be contained in the molding composition in amounts of up to, for example, 1,000 g, preferably up to 400 g, per 100 g of the lithogenous component.

The type of fillers comprises a great variety; readily accessible, inorganic materials in ground or distributed form are preferred, in this connection, for example, rock flours, basalts, clays, feldspars, ground mica, ground glass, quartz sand or quartz flour, ground bauxite, hydrated alumina, and wastes from the alumina, bauxite or corundum industry, ashes, slags, as well as mineral fiber materials. Furthermore, organic fiber materials can be present, for example, cellulose, fibers or synthetic fibers, as the reinforcing fillers. An especially valuable filler is fly ash from coal-burning power plants with boiler temperatures of below 1,600° C. Such fly ash is neither reactive nor lithogenous, but can be readily mixed in because it is finely divided.

The degree of grinding and the grain fineness are to be adapted to the respective usage purpose; in this connection, it is frequently suitable to provide very fine proportions alongside grain sizes of specific dimensions, concomitantly determining the physical properties.

Dyeing, especially by means of pigments, is possible.

The molded parts generally exhibit only low mold shrinkage and no crack formation during hardening, a prerequisite being a thorough intermixing of the molding composition.

The high flexural stress at break also permits the manufacture of molded parts having large dimensions and of large-area, flat molded components usable, for example, as panels for the lining of walls or for the covering of roofs in the manner of slate slabs, clinkers, or coverings, and being of special value in this area on account of their flexural strength at break.

The molding compositions provide close adherence to the shape of the mold and permit the embossing of specific surface textures, recesses, and undercut areas.

Insofar as desired, subsequent working of the surface can be performed by, for example, grinding, milling and drilling. The surface can optionally be provided with a varnish coat.

The special advantage of the molded parts according to this invention resides in that molded parts are obtained which, in many instances, can replace ceramic molded components, but which can be produced in an energy-saving fashion, since a baking step, such as in case of ceramic materials, is unnecessary.

EXAMPLE 1

Electrostatic precipitator ash from high-temperature coal combustion at 1,600°-1,700° C. in a power plant, containing about 50-60% by weight of $SiO_2$ in the form of amorphous glass in addition to about 30% by weight of $Al_2O_3$ as well as 8-11% by weight of $Fe_2O_3$ and other oxides, is mixed with a solution, prepared by dissolving precipitated amorphous silicic acid in 50% by weight potassium hydroxide solution and containing 1.82 moles of $SiO_2$ per mole of $K_2O$, in a weight ratio of ash to solution of 3 : 2 and allowed to stand at room temperature for 30 minutes; then quartz sand and quartz flour are admixed in the same proportions corresponding to the aforementioned solution. The mixture is placed in molds and hardened within 90 minutes at 85° C. Flexural stress at break: 13.1 $N/mm^2$.

EXAMPLE 2

A mixture is prepared from 272 g of the electrostatic precipitator ash described in Example 1 and 106 g of the solution set forth in Example 1, and allowed to stand for 60 minutes. After addition of 106 g of quartz sand and filling into a mold, the mixture is hardened at 85° C. within 30 minutes. Flexural stress at break: 14.1 $N/mm^2$.

EXAMPLE 3

106 g of the electrostatic precipitator ash according to Example 1 and 106 g of the solution as described in Example 1 are combined with fillers, namely, 126 g of fly ash obtained as a nonreactive substance in coal-burning power plants operating at a lower temperature, introduced into a mold, and hardened within 30 minutes at 85° C. Flexural stress at break: 12.5 N/mm².

EXAMPLE 4

A potassium silicate solution with a molar ratio of SiO₂ to K₂O of 1.5 1 is prepared by dissolving precipitated silicic acid with 48% by weight SiO₂ content in amorphous form in a 50% by weight potassium hydroxide solution. Into 166 g of this solution are introduced 106 g of finely ground calcined bauxite (grain size below 0.315 mm) and, as a nonreactive filler, 212 g of fly ash from coal-burning power plants; the mixture is homogenized, then filled into molds, and hardened within 240 minutes at 85° C. The test specimens have a flexural stress at break of 17.8 N/mm².

EXAMPLE 5

A mixture is prepared from 166 g of the potassium-alkaline silicic acid solution described in Example 4 with 100 g of ground calcined bauxite, with 66 g of reactive furnace filter dust from arc melting of bauxite to obtain corundum, and with 212 g of fly ash from coal-burning power plants, introduced into molds, and hardened within 30 minutes at 85° C. Flexural stress at break: 13 N/mm².

EXAMPLE 6

166 g of the potassium silicate solution described in Example 4 is homogeneously mixed with 186 g of the finely ground calcined bauxite according to Example 4 and also, serving as the filler, with 212 g of the fly ash from coal-burning power plants according to Example 4 and with 17 g of iron oxide, black, as well as 1.7 g of borax, introduced into molds, and hardened for 120 minutes at 85° C. Flexural stress at break: 11.5 N/mm².

EXAMPLE 7

A mixture is produced from 106 g of silicic acid solution, prepared as in Example 4, but with a molar ratio of 1.8 SiO₂ to 1 K₂O, with 2 g of furnace filter dust from the arc melting of bauxite to obtain corundum, with 184 g of calcined bauxite, and 212 g of quartz flour as the filler, introduced into molds, and hardened at 85° C. for 240 minutes. Flexural stress at break: 17.2 N/mm².

EXAMPLE 8

Example 7 is repeated, except that the filler quartz flour is added after a preliminary reaction period of 30 minutes. The hardening time at 85° C. is shortened to 60 minutes. Flexural stress at break: 16.5 N/mm².

EXAMPLE 9

The silicic acid solution, according to Example 7, is mixed with 26 g of furnace filter dust obtained in the electrochemical production of mullite, with 166 g of calcined bauxite, with 106 g of quartz sand, and with 106 g of fly ash, dispensed into molds, and hardened at 85° C. within 45 minutes. Flexural stress at break: 12 N/mm².

What is claimed is:

1. An inorganic, aqueous molding composition hardenable at low temperatures, which contains an alkali silicate solution, an inorganic, solid component reactive with the alkali silicate solution, and optionally proportions of fillers and auxiliary materials said composition containing 0.5-4.0 parts by weight of the inorganic solid component per part by weight of the alkali silicate solution; said solid component consisting essentially of
   (a) vitreous amorphous electrostatic precipitator ash having 45-60% by weight of vitreous $SiO_2$, 25-35% by weight of $Al_2O_3$, and 8-11% by weight of $Fe_2O_3$, and/or
   (b) ground calcined bauxite, and the alkali silicate solution containing 1.2-2.5 moles of $SiO_2$ per mole of $K_2O$ and/or $Na_2O$.

2. A molding composition according to claim 1, wherein the aqueous solution of alkali silicate is produced entirely or partially by dissolving amorphous disperse-pulverulent, aqueous silicic acid in an alkali hydroxide or in the aqueous solutions of the latter.

3. A molding composition according to claim 1, wherein components (a) and/or (b) are replaced, in part, with up to 10% by weight, by an oxide mixture of amorphous $SiO_2$ and aluminum oxide obtained as furnace filter dust.

4. A molding composition according to claim 2, wherein components (a) and/or (b) are replaced, in part, with up to 10% by weight, by an oxide mixture of amorphous $SiO_2$ and aluminum oxide obtained as furnace filter dust.

5. A molded part produced from a molding composition which contains an alkali silicate solution and an inorganic solid component reactive with the alkali silicate solution and optionally proportions of fillers and auxiliary agents, said composition containing 0.5-4.0 parts by weight of the inorganic solid component per part by weight of the alkali silicate solution; said solid component consisting essentially of
   (a) vitreous amorphous electrostatic precipitator ash having 45-60% by weight of vitreous $SiO_2$, 25-35% by weight of $Al_2O_3$, and 8-11% by weight of $Fe_2O_3$ and/or
   (b) ground calcined bauxite, and the alkali silicate solution containing 1.2-2.5 moles of $SiO_2$ per mole of $K_2O$ and/or $Na_2$,
wherein the solid component and the alkali silicate solution, as well as fillers are mixed together, the resultant molding composition is filled into a mold, the solidified molding composition is removed from the mold as a molded part and is optionally hardened at temperatures of at least 50°.

6. A molded part according to claim 5, wherein hardening takes place at 50°-100° C.

7. A molded part according to claim 5, wherein hardening takes place in the mold.

8. A molded part according to claim 6, wherein hardening takes place in the mold.

9. A molded part according to claim 5, wherein solidification occurs in the mold and hardening takes place after removing the molded part from the mold.

10. A molded part according to claim 6, wherein solidification occurs in the mold and hardening takes place after removing the molded part from the mold.

11. A molded part according to claim 5, wherein hardening takes place at 50°-500° C., preferably 50°-200° C., under pressure.

12. A molded part according to claim 5, wherein heating up to 500° C. is effected after solidification, as the hardening step or after a hardening step, under normal pressure or under elevated pressure.

13. A molded part according to claim 6, wherein heating up to 500° C. is effected after solidification, as the hardening step or after a hardening step, under normal pressure or under elevated pressure.

14. A molded part according to claim 7, wherein heating up to 500° C. is effected after solidification, as the hardening step or after a hardening step, under normal pressure or under elevated pressure.

15. A molded part according to claim 8, wherein heating up to 500° C. is effected after solidification, as the hardening step or after a hardening step, under normal pressure or under elevated pressure.

16. A molded part according to claim 9, wherein heating up to 500° C. is effected after solidification, as the hardening step or after a hardening step, under normal pressure or under elevated pressure.

17. A process for producing a molded part from a molding composition according to claim 5, wherein the molding composition is filled into a mold as fluid, the solidified molded composition is removed as an initially molded part and the initially molded part is hardened at temperatures of at least 50° C.

* * * * *